US005760832A

United States Patent [19]
Yamanaka et al.

[11] Patent Number: 5,760,832
[45] Date of Patent: Jun. 2, 1998

[54] MULTIPLE IMAGER WITH SHUTTER CONTROL

[75] Inventors: Mutsuhiro Yamanaka, Yao; Kazuchika Sato, Kobe, both of Japan

[73] Assignee: Minolta Co., Ltd., Osaka, Japan

[21] Appl. No.: 570,235

[22] Filed: Dec. 11, 1995

[30] Foreign Application Priority Data

Dec. 16, 1994 [JP] Japan ................... 6-313334

[51] Int. Cl.$^6$ ........................................... H04N 9/09
[52] U.S. Cl. .................... 348/264; 348/265; 348/338
[58] Field of Search ............................... 348/262, 264, 348/265, 336, 337, 338, 339, 222, 367, 368; 358/50, 43; H04N 9/09, 9/097

[56] References Cited

U.S. PATENT DOCUMENTS

| 4,334,238 | 6/1982 | Morishita et al. ............ 358/43 |
| 5,374,955 | 12/1994 | Furuhata ....................... 348/264 |
| 5,414,465 | 5/1995 | Kodama et al. ............... 348/236 |

FOREIGN PATENT DOCUMENTS

| 60-154781 | 8/1985 | Japan. |
| 6-217330 | 8/1994 | Japan. |
| 6339146 | 12/1994 | Japan. |

OTHER PUBLICATIONS

NHK Giken R & D Magazine (The Dual Green Pickup Experiment for A Compact HDTV Color Camera with three-⅔" CCDS), 1992, with English translation.

*Primary Examiner*—Sherrie Hsia
*Attorney, Agent, or Firm*—Sidley & Austin

[57] ABSTRACT

An image forming optical system comprises interchangeable lens 14 of a single lens reflex camera and reduction relay optical system 15. A three-color separating prism 16 that separates the photo image into two green photo images (G1 and G2) and a red/blue photo image (R/B) is located behind the image forming optical system, and CCDs 19 through 17 that perform image sensing as to RB, G2 and G1 photo images are located behind the transparent surfaces of prisms 16a through 16c, respectively. G1 CCD 17 and RB CCD 19 perform image sensing for the same photo image area while G2 CCD 18 performs image sensing for a photo image area which is offset by distance $\sqrt{\{(PH/2)^2+(PV/2)^2\}}$ (PH: lateral pixel pitch, PV: vertical pixel pitch) in the lower right direction relative to G1 CCD 17.

10 Claims, 15 Drawing Sheets

MULTIPLE IMAGER WITH SHUTTER CONTROL

BACKGROUND OF THE INVENTION

1. Field of the Invention

The present invention pertains to an image pickup device that obtains color image signals regarding the photo object using multiple image pickup elements such as CCDs, or to equipment accompanying such an image pickup device.

2. Description of the Prior Art

Various types of image pickup devices have been proposed, which increase the effective pixel density (i.e., the resolution) on the image pickup screen through sensing, using multiple image pickup elements of the photo image of a photo object that has been separated into photo images having R, G or B color components via a color separating prism, and then synthesizing these sensed images.

Japanese Laid-Open Patent Publication No. Sho 60-154781, for example, discloses an image pickup device which increases the resolution by combining a color separating prism that separates the photo object image into four color components with four image pickup elements comprising two image pickup elements for photo images of green color components (hereinafter 'G photo image pickup elements'), an image pickup element for photo images of blue color components (hereinafter 'B photo image pickup element') and an image pickup element for photo images of red color components (hereinafter 'R photo image pickup element'), wherein the so-called spatial-pixel-offset method is applied.

FIG. 15 is a side elevation of an image pickup unit of said image pickup device, comprising a four-color separating prism and four image pickup elements.

As shown in FIG. 15, color-separating prism 100 comprises a first prism 100a that separates the blue color components from the incident light, a second prism 100b that separates the red color components, and third and fourth prisms 100c and 100d that separate the green color components B photo image pickup element 101, R photo image pickup element 102, and first and second G photo image pickup elements 103 and 104 are respectively placed on the end surfaces, through which the light passes, of prisms 100a through 100d.

If the positions of image pickup elements 101 through 104 are defined based on the positions of the image pickup surfaces relative to the photo image of the photo object, and the locations of the image pickup elements are expressed in terms of their positions relative to the position of first G photo image pickup element 103, which is designated as the reference position, R photo image pickup element 102 is offset by prescribed pixel pitch Px in the horizontal direction, B photo image pickup element 101 is offset by prescribed pixel pitch Py in the vertical direction and second G photo image pickup element 104 is offset by prescribed pixel pitches Px and Py in the horizontal and vertical directions, respectively.

FIG. 16 shows one example of the relative positions of said four image pickup elements in terms of the offset positioning of pixels on the image pickup surface.

In FIG. 16, G1 (i, j), G2 (i, j), R (i, j) and B (i, j) (i=j=1, 2, . . . ) are pixels at position (i, j) on first G photo image pickup element 103, second G photo image pickup element 104, R photo image pickup element 102 and B photo image pickup element 101, respectively. In terms of the relative positional relationships among the four image pickup elements 101 through 104 shown in the drawing, R photo image pickup element 102 is offset by lateral pixel pitch PH/2 in the horizontal direction, B photo image pickup element 101 is offset by vertical pixel pitch PV/2 in the vertical direction and second G photo image pickup element 104 is offset by said pixel pitches PH/2 and PV/2 in the horizontal and vertical directions (lower right direction), respectively.

An image pickup device of the type shown in FIG. 16 is characterized by the fact that in the case of an achromatic image, because there are twice as many effective pixels in both horizontal and vertical directions as in an image pickup device comprising a single image pickup element, the resolution increases, as well as by the fact that in the case of a chromatic image, because there are twice as many green color components as there are in an image pickup device comprising a single image pickup element, there is less deterioration of image quality.

In addition, Japanese Laid-Open Patent Publication No. Hei 6-217330, for example, discloses an image pickup device that increases the resolution by using the spatial-pixel-offset method, in which a three-color separating prism and three image pickup elements, i.e., an R photo image pickup element, a G photo image pickup element and a B photo image pickup element, are used in combination.

FIG. 17 is a side elevation of an image pickup unit of an image pickup device of the type disclosed in JP (A) 6-217330 which comprises a three-color separating prism and three image pickup elements.

In FIG. 17, color separating prism 110 comprises first a prism 110a that separates photo images of blue color components from the incident photo image, a second prism 110b that separates photo images of red color components and a third prism 110c that separates photo images of green color components R photo image pickup element 111, B photo image pickup element 112 and G photo image pickup element 113 are placed on the end surfaces, through which the light passes, of prisms 110a through 110c, respectively.

FIG. 18 shows one example of the relative positions of the three image pickup elements for such a device in terms of the offset positioning of pixels on the image pickup surface.

In FIG. 18, G1 (i, j), R (i, j) and B (i, j) (i=j=1, 2, . . . ) are pixels at position (i, j) on G photo image pickup element 113, R photo image pickup element 111 and B photo image pickup element 112, respectively. As shown in the drawing, R photo image pickup element 111 and B photo image pickup element 112 are displaced relative to G photo image pickup element 113 by said pixel pitches $P_H/2$ and $P_V/2$ in the horizontal and vertical directions (lower right direction), respectively. Therefore, pixel R (i, j) and pixel B (i, j) both perform image sensing on the same area of the photo image, which however is different from the area as to which image sensing is performed by pixel G1 (i, j) in the amount of $\sqrt{\{(P_H/2)^2+(P_V/2)^2\}}$ in the lower right direction.

Said image pickup device is also characterized by the fact that its resolution increases in the case of an achromatic image because the number of effective pixels is double that of an image pickup device comprising a single image pickup element in both the horizontal and vertical directions.

In addition, a method called the dual green method has also been proposed, in which the resolution is increased by separating the incident photo image into two photo images of green color components and a photo image of red and blue color components, and by sensing the photo images of respective color components using the spatial-pixel-offset method (NHK Science and Technical Research Laboratories, "The Dual Green Pickup Experiment For A Compact HDTV Color Camera With Three ⅔" CCDs", No. 19, pp1–8, May 1992).

FIG. 19 is a side elevation of an image pickup unit using said dual green method, comprising a three-color separating prism and three image pickup elements. FIG. 20 shows one example of the relative positions of said three image pickup elements in terms of the offset positioning of pixels on the image pickup surface.

The image pickup unit shown in FIG. 19 has the same basic construction as the image pickup unit shown in FIG. 17, however, it differs in that the color components are separated by color separating prism 120 into two photo images of green color components and a photo image of red and blue color components (magenta).

First and second G photo image pickup elements 121 and 123 obtain green image signals using their entire surfaces. However, image pickup element 122 for photo images of red and blue color components (hereinafter 'R/B photo image pickup element') has red and blue vertical stripe filters alternately lined up in a lateral fashion so that red and blue image signals may be alternately obtained.

Therefore, as shown in FIG. 20, pixel G1 ($2i$, $2k-1$) indicated by a solid line senses the same area of the photo image as pixel B ($2i$, $2k-1$) indicated by a dotted line, and pixel G1 ($2i$, $2k$) senses the same area of the photo image as pixel R ($2i$, $2k$). In addition, G2 (i, j) indicated by a dashed line senses an area which is offset by pixel pitch $P_H/2$ in the horizontal direction relative to the area sensed by pixel G1 (i, j).

The dual green method is characterized by the fact that a high resolution may be obtained without the occurrence of aliasing noise because in the horizontal direction the number of pixels for green color components is double that for an image pickup device comprising a single image pickup element.

Furthermore, a single lens reflex camera that can function as a still video camera through the mounting of a still video back to the camera body has been conventionally known.

Such still video back comprises a reduction relay optical system and an image pickup element, and when it is mounted on a single lens reflex camera, the real image of the photo object that is formed on the film surface is re-formed on the image pickup surface of said image pickup element via said reduction relay optical system.

The image pickup device disclosed in said Japanese Laid-Open Patent Publication No. Sho 60-154781 separates the photo image of the photo object into photo images of four color components that are respectively sensed such that the image signals for each color component are processed separately, as a result of which the constructions of the separating optical system, image pickup system and signal processing system become large, and the processing of signals becomes complex. Moreover, since this image pickup device does not use a relay lens system as the image forming optical system, a devoted optical system that forms images corresponding to the resolutions of image pickup elements 101 through 104 on the image pickup surfaces is needed, and therefore it is difficult to construct an image forming optical system by using the camera's interchangeable lens system.

Furthermore, using the image pickup device disclosed in Japanese Laid-Open Patent Publication No. Hei 6-217330, if the balance among image signals of R, G and B color components is set such that accurate brightness signals may be obtained for an achromatic photo object, where image sensing is performed on a chromatic photo object, that balance will be lost. For example, an imbalance occurs in the brightness values of the pixels of R photo image pickup element 111 that receive light as to red areas of the photo object, the pixels of B photo image pickup element 112 that receive light as to blue areas of the photo object and the pixels of G photo image pickup element 113 that receive light as to green areas of the photo object. Consequently, when the sensed images are regenerated, stripes due to spurious resolution may take place, reducing the quality of the image.

In regard to image pickup devices that use the dual green method, because the spatial-pixel-offset method is used for the G photo image pickup elements only in the horizontal direction, only the horizontal resolution for G color components increases, and therefore the resolution cannot be uniformly increased for the entire screen. In addition, where the color of the photo object is reddish or bluish, the resolution becomes poor in comparison with when the color of the photo object is greenish since the resolution for R components and B components is one-quarter of the resolution for G components, resulting in a flat image.

In both the image pickup device disclosed in Japanese Laid-Open Patent Publication No. Hei 6-217330 and the image pickup device using the dual green method, a devoted optical system corresponding to the resolution of the image pickup elements is usually required. However, technology to construct a devoted image-forming optical system using the camera's interchangeable lens system is not mentioned in either of the above-referenced gazette or article.

On the other hand, the optical system shown in the conventional still video camera forms the photo image of the photo object on a single image pickup element and does not pertain to a image pickup device which performs image sensing by separating the photo image onto three image pickup elements and in which a higher resolution is required than in a single image pickup element device.

SUMMARY OF THE INVENTION

The object of the present invention is to provide an image pickup device capable of obtaining high quality images using a simple construction, or to provide equipment accompanying said device.

Another object of the present invention is to provide an image pickup device capable of obtaining images using an interchangeable lens of a camera, or to provide equipment accompanying said device.

These and other objects, advantages and features of the invention will become apparent from the following description which, taken in conjunction with the accompanying drawings, which illustrate specific embodiments of the invention.

BRIEF DESCRIPTION OF THE DRAWINGS

In the following description, like parts are designated by like reference numbers throughout the several drawings.

FIG. 12(a) shows the relationship between R pixel data GD (i, 2k−1) and B pixel data GD (i, 2k). FIG. 12(b) is a waveform chart for sample hold signals SHDR to extract R pixel data GD (i, 2k−1). 12(c) is a waveform chart for sample hold signals SHDB to extract B pixel data GD (i, 2k).

DESCRIPTION OF THE PREFERRED EMBODIMENTS

Figure 1:
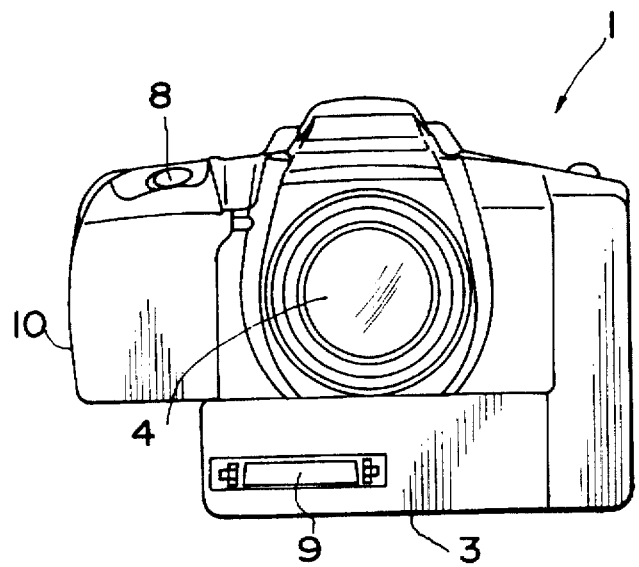
FIG. 1 shows one embodiment of the present invention and is a plan view of a still video camera equipped with the image pickup device.
Figure 2:
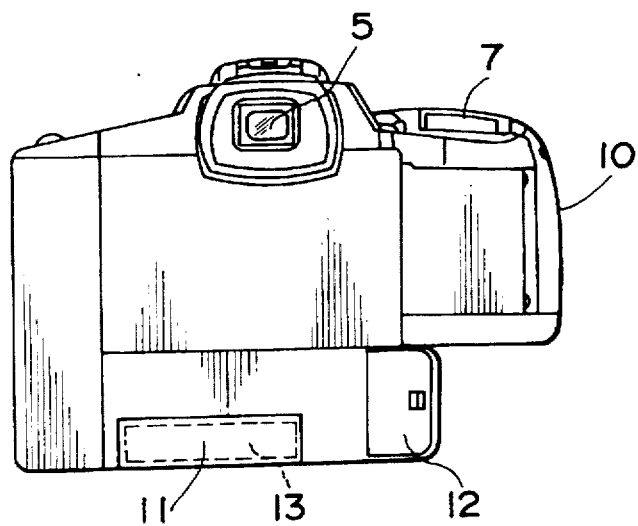
FIG. 2 is a rear view of the still video camera shown in FIG. 1.
Figure 3:
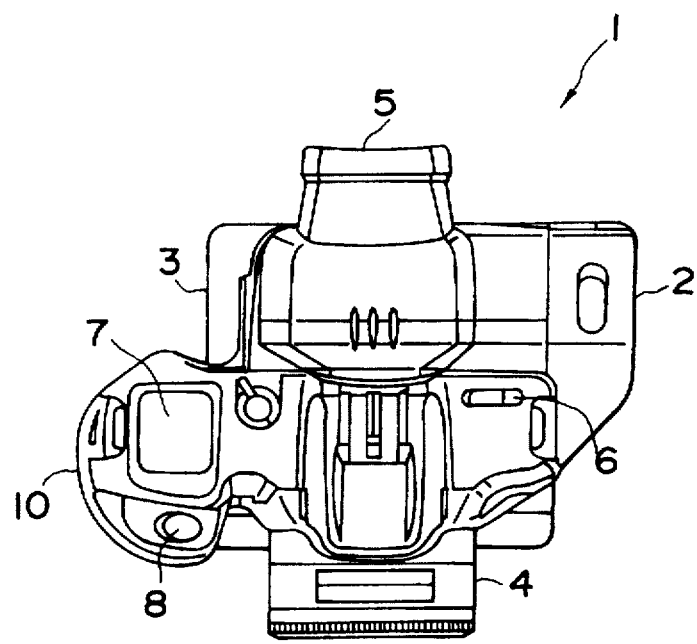
FIG. 3 is a top view of the still video camera shown in FIG. 1.

FIGS. 1 through 3 show one embodiment of the present invention. They are a front view, a rear view and a top view of a still video camera equipped with an image pickup device, respectively.

Still video camera 1 of this embodiment is constructed by removing the rear cover of body 10 of an interchangeable-lens single lens reflex camera and attaching still video adapter 2 to where the rear cover existed. Beneath said still video adapter 2 is HDD drive control unit 3 that controls the drive of hard disk device 13 to record the photographed still image.

Interchangeable lens 4 for use with a single lens reflex camera is interchangeably mounted on the front and approximate center of camera body 10, and viewfinder 5 is located in the upper area and approximate center of the back of camera body 10. As shown in FIG. 3, there is also a power supply switch located 6 comprising a slide switch on top and toward the right of camera body 10, as well as liquid crystal display unit 7 and release switch 8 toward the left.

Additional features include, connector 9 for connection with an external computer which is located at an appropriate position on the front of HDD drive control unit 3, as shown in FIG. 1; mounting bay 12, where power supply batteries for the still video camera are placed; and mounting bay 11, where hard disk device 13 is placed, which are located toward the right and the left at the back of camera body 10 respectively, as shown in FIG. 2.

Connector 9 is a connector to transfer data such as images and photo-taking information recorded in hard disk device 13 to external computer PC.

Figure 4:
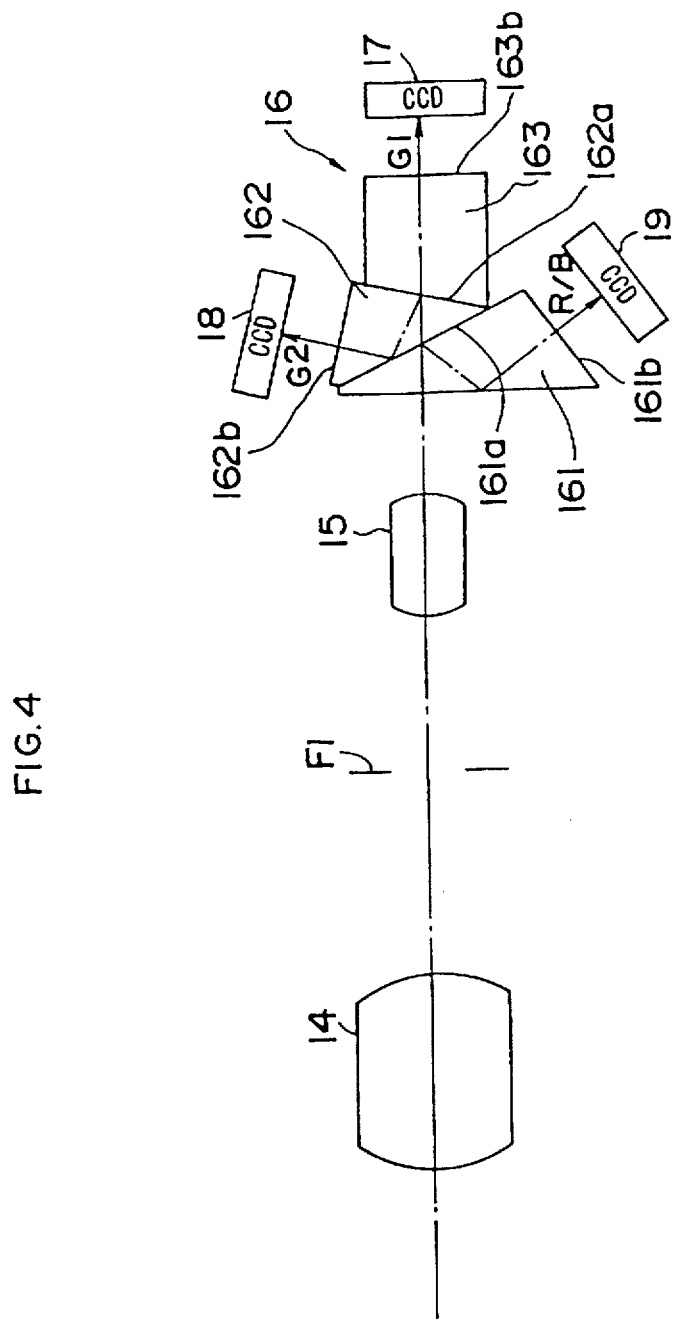
FIG. 4 shows a simplified construction of an image-forming optical system and an image pickup unit of the still video camera shown in FIG. 1.

FIG. 4 shows a simplified construction of the image-forming optical system and image pickup unit of the still video camera.

In the drawing, optical system 14 (first optical system) is a photo-taking lens system located in interchangeable lens 4. It forms the real image of the photo object on first image forming plane F1. Optical system 15 (second optical system) comprises a reduction relay optical system. It causes the real image formed on first image forming plane F1 to be re-formed as a reduced photo image on the image pickup surfaces of image pickup elements 17 through 19 via color separating prism 16. Said optical system 14 and optical system 15 constitute the image-forming optical system of still video camera 1. Shutter device 40 is positioned behind the optical system 15 and controls light exposure from the optical system into the rest of the camera.

Color separating prism 16 (color separating optical system) is a three-color separating prism comprising first prism 161, second prism 162 and third prism 163. A dichroic layer (i.e., magenta reflecting surface) that reflects red and blue colors (magenta color) is formed on border surface 161a between first prism 161 and second prism 162, while a dichroic layer (i.e., green reflecting surface) that reflects part of green color is formed on border surface 162a between second prism 162 and third prism 163.

The light led by said image forming optical system enters first prism 161. Of the light, the red and blue spectra are reflected by reflecting surface 161a so that their optical path changes in first prism 161 and the spectra are output from transparent surface 161b.

On the other hand, the green spectrum, which passes through reflecting surface 161a of first prism 161, enters second prism 162. Part of the green spectrum is then reflected by reflecting surface 162a so that its optical path changes in second prism 162 and part of the green the spectrum is output from transparent surface 162b. The remainder of the green spectrum passes through reflecting surface 162a and enters third prism 163, where it advances straight through and is output from transparent surface 163b.

Image pickup element 19 (third image pickup means) that senses the photo image of red and blue color components (hereinafter 'R/B photo image') is located behind transparent surface 161b of first prism 161, while image pickup element 18 (second image pickup means) that senses the photo image of green color components (hereinafter 'G2 photo image') is located behind transparent surface 162b of second prism 162, and image pickup element 17 (first image pickup means) that senses the photo image of green color components (hereinafter 'G1 photo image') is located behind transparent surface 163b of third prism 163. Image pickup elements 17 through 19 are CCD color area sensors comprising multiple photoelectric conversion elements (hereinafter 'pixels') aligned in a two-dimensional matrix having n rows and m columns.

Figure 5:
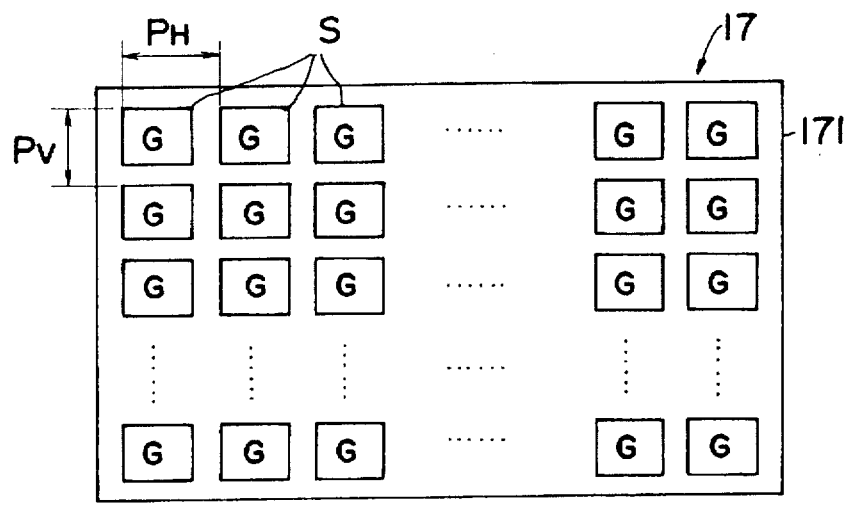
FIG. 5 shows a simplified construction of the image pickup surface of the image pickup element that senses G (green) photo images in said embodiment.
Figure 6:
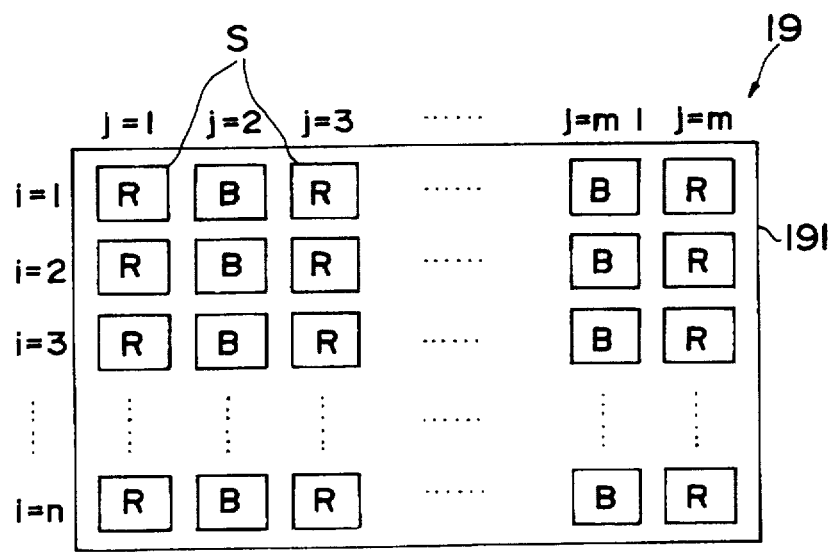
FIG. 6 shows a simplified construction of the image pickup surface of the image pickup element that senses R/B (magenta) photo images in said embodiment.

FIG. 5 shows a simplified construction of the image pickup surface of image pickup element 17 that senses the G1 photo image. FIG. 6 shows a simplified construction of the image pickup surface of image pickup element 19 that senses the R/B photo image.

Image pickup element (hereinafter 'CCD') 17 has image pickup surface 171 which is of a wide rectangular configuration. Multiple pixels S are aligned in a two-dimensional fashion on this image pickup surface 171, with the pixels having a pixel pitch $P_H$ in the horizontal direction and a pixel pitch of $P_V$ in the vertical direction. Image signals for G1 color components are obtained through photoelectric conversion of a green photo image by the pixels. CCD 18 has the identical construction as CCD 17.

On the other hand, CCD 19 has image pickup surface 191 of the same size as CCD 17 and CCD 18. Its pixels S are also aligned in the same manner as CCD 17 and CCD 18. However, red and blue vertical stripe filters are used so that each pixel S is covered by either a red or blue stripe. In other words, if the alignment position in the matrix is expressed by (i, j) (i=1, 2, ..., n, j=1, 2, ..., m) and the pixel located at position (i, j) is pixel S (i, j), red filters cover pixels S (i, 2k−1) (k=1, 2, ..., m/2), which are positioned in odd numbered columns (indicated by the letter R in the drawing) while blue filters cover pixels S (i, 2k), which are positioned in even numbered columns (indicated by letter B in the drawing). Blue image signals and red image signals are obtained through photoelectric conversion of the magenta photo image by the pixels.

If the G1 photo image data for the pixel positioned at (i, j) is expressed as G1 (i, j), the data as G2 (i, j), the image data as B (i, j), and R photo image data as R (i, j), then, embodiment, image signals for the G1 photo image and G2 photo image comprise ΣG1 (i, j) and ΣG2 (i, j), respectively, while image signals for the R photo image comprise ΣB (i, 2k−1) and image signals for the B photo image comprise ΣB (i, 2k).

The three CCDs 17, 18 and 19 are located at prescribed positions on the optical axes of the three rays of light that advance through color separating prism 16 such that they may perform image sensing of the photo image of the photo object by means of the spatial-pixel-offset method described above.

Figure 7:
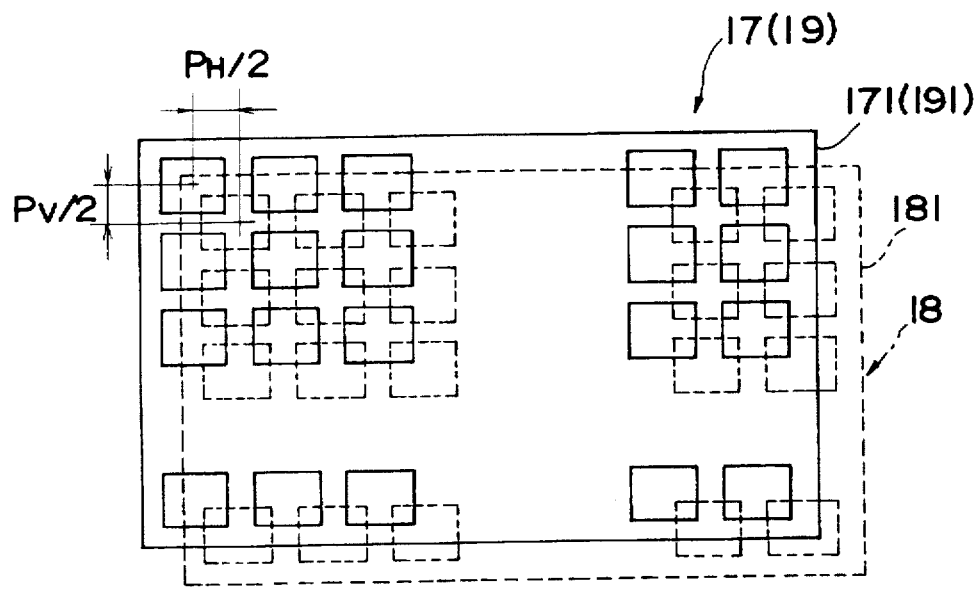
FIG. 7 shows the relative relationships among the three CCDs in terms of areas of the photo image on which image sensing is performed in said embodiment.

FIG. 7 shows the positions of CCDs 17 through 19 in terms of the relative relationships of the positions of image pickup surfaces 171 through 191 for the G1 photo image, G2 photo image and R/B photo image, which are the objects of image sensing, (that is, in terms of the areas as to which image sensing is performed). In this drawing, the position of image pickup surfaces 171 of CCD 17 and 191 of CCD 19 are shown as the reference position and the position of image pickup surface 181 of CCD 18 is shown as being offset relative to said reference position.

As shown in the drawing, image pickup surface 181 of CCD 18 is offset relative to image pickup surface 171 of CCD 17 by pixel pitch $P_H/2$ and pixel pitch $P_V/2$ in the horizontal and vertical directions, respectively. In other words, CCD 18 is offset from CCD 17 by distance $L=\sqrt{(P_H/2)^2+(P_V/2)^2}$ in the lower right direction in terms of the area to which image sensing is performed. On the other hand, the area as to which image sensing is performed by CCD 19 is the same as the area as to which image sensing is performed by CCD 17 and there is no offset positioning.

Figure 8:
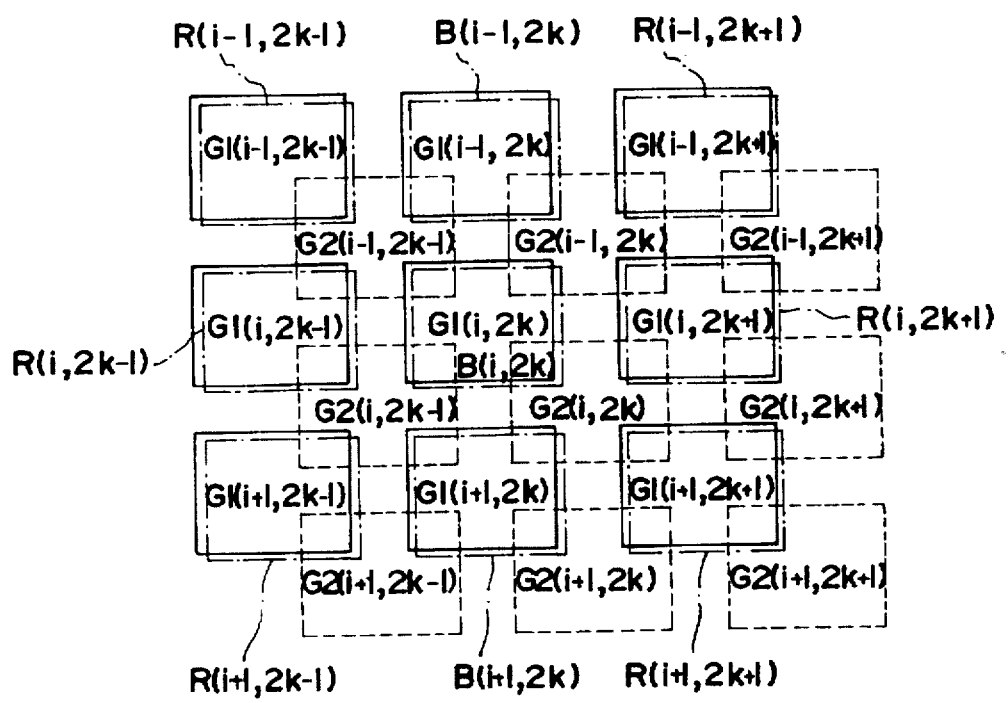
FIG. 8 is an enlargement of part of FIG. 7.

Therefore, as shown in FIG. 8, pixel data G2 (i, j) of CCD 18 is data for an area offset by distance $L=\sqrt{(P_H/2)^2+(P_V/2)^2}$ in the lower right direction relative-to pixel data G1 (i, j) of CCD 17. Pixel data B (i, 2k−1) of CCD 19 for B color components is data for the same area as pixel data G1 (i, 2k−1) of CCD 17, and pixel data R (i, 2k) for R color components is for the same area as pixel data G1 (i, 2k) of CCD 17.

Figure 9:
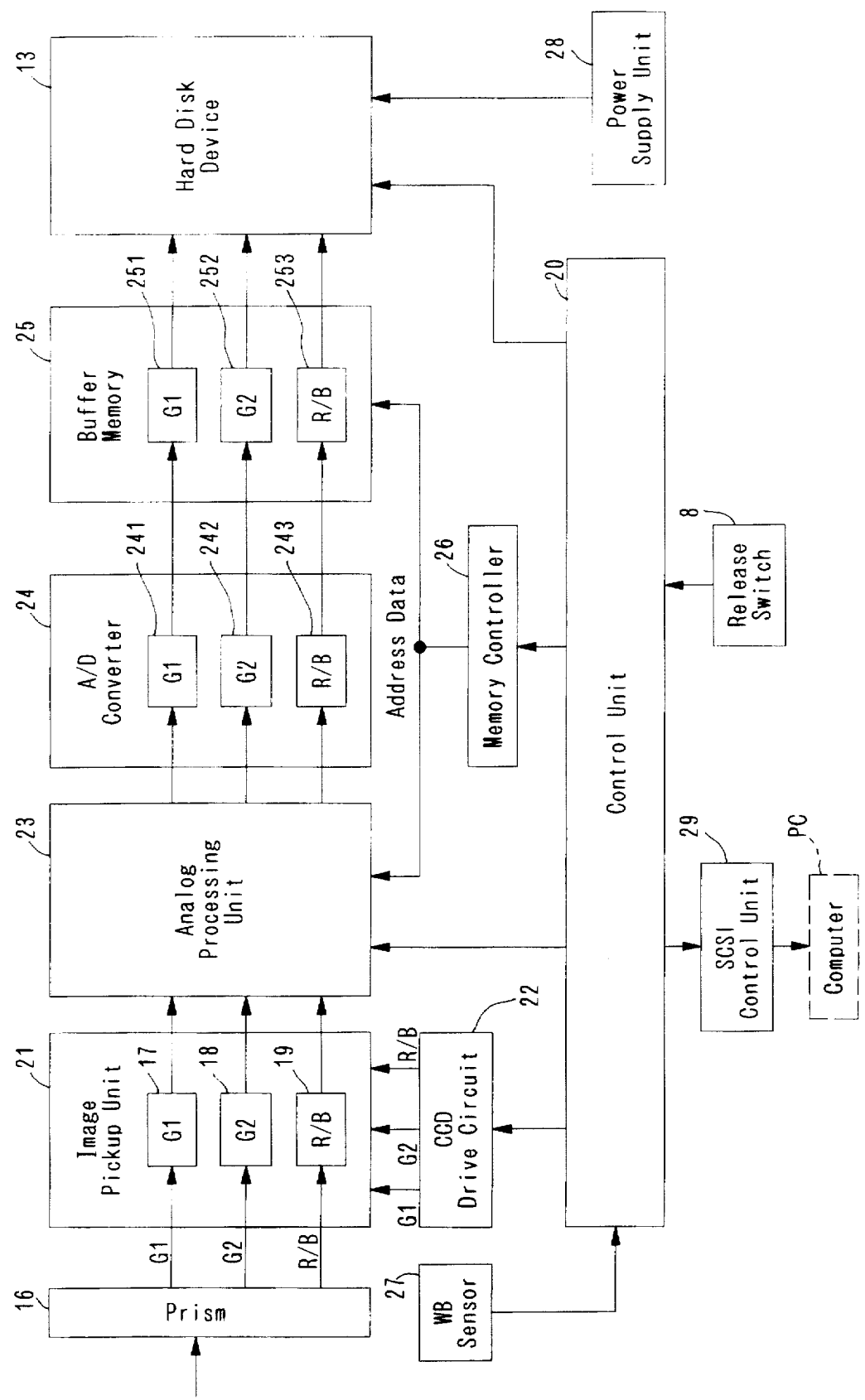
FIG. 9 is a block diagram of the still video camera shown in FIG. 1.

FIG. 9 is a block diagram of the still video camera.

In the drawing, the members which are identical as the members shown in FIGS. 1 through 3 are given the identical numbers. Image pickup unit 21 is a block which senses the photo images of the photo object that are obtained after color separation, and comprises said CCDs 17 through 19. CCD drive circuit 22 controls the drive of CCDs 17 through 19 of image pickup unit 21.

Analog processing unit 23 performs prescribed processing of image signals (analog signals) output from image pickup unit 21. Analog processing unit 23 performs the prescribed processing of the image signals corresponding to photo images of the G1, G2 and R/B color components (hereinafter 'G1 image signals', 'G2 image signals' and 'R/B image signals'), respectively. A detailed explanation of analog processing unit 23 is provided below.

A/D converter 24 converts image signals of the respective color components, which are output from analog processing unit 23, into digital signals. A/D converter 24 comprises three A/D conversion circuits 241, 242 and 243 which correspond to G1 image signals, G2 image signals and R/B image signals, respectively.

Buffer memory 25 temporarily saves the image signals that were converted from analog to digital signals by means of A/D converter 24 (hereinafter 'image data') in order to save them in hard disk device 13. Buffer memory 25 comprises three memories 251, 252 and 253 that correspond to image data of photo images of the G1, G2 and R/B color components, respectively (hereinafter 'G1 image data', 'G2 image data' and 'R/B image data') and memories 251, 252 and 253 each have a memory capacity sufficient for one frame.

Memory controller 26 generates address data for the performance of processing and A/D conversion of the image signals. G1 image signals, G2 image signals and R/B image signals are time-series signals comprising light received signals of pixels S (i, j) (hereinafter 'pixel data GD (i, j)), which comprise the CCD, with the signals being read in succession. Memory controller 26 generates address data for pixel data GD (i, j) that is the object of the processing and A/D conversion (address data set for pixel position (i, j)), and outputs this address data to analog processing unit 23 and buffer memory 25.

WB sensor 27 is a sensor to receive the color temperature data for the reference white used for white balance adjustment. The color temperature data is processed through A/D conversion and input into control unit 20. Control unit 20 calculates compensation data for white balance adjustment of red and blue based on the color temperature data thus input, and sends this compensation data to analog processing unit 22.

Power supply unit 28 generates power and provides power for hard disk device 13 from power supply batteries.

SCSI (Small Computer System Interface) control unit 29 controls the interface between the still video camera and external computer PC to which the still video camera is connected via said connector 9. It controls the transfer of data recorded in hard disk device 13 to computer PC.

Control unit 20 comprises a microcomputer. It centrally controls the photo-taking operation of the still video camera as well as the recording of G1 image data, G2 image data and R/B image data to hard disk device 13.

Figure 10:
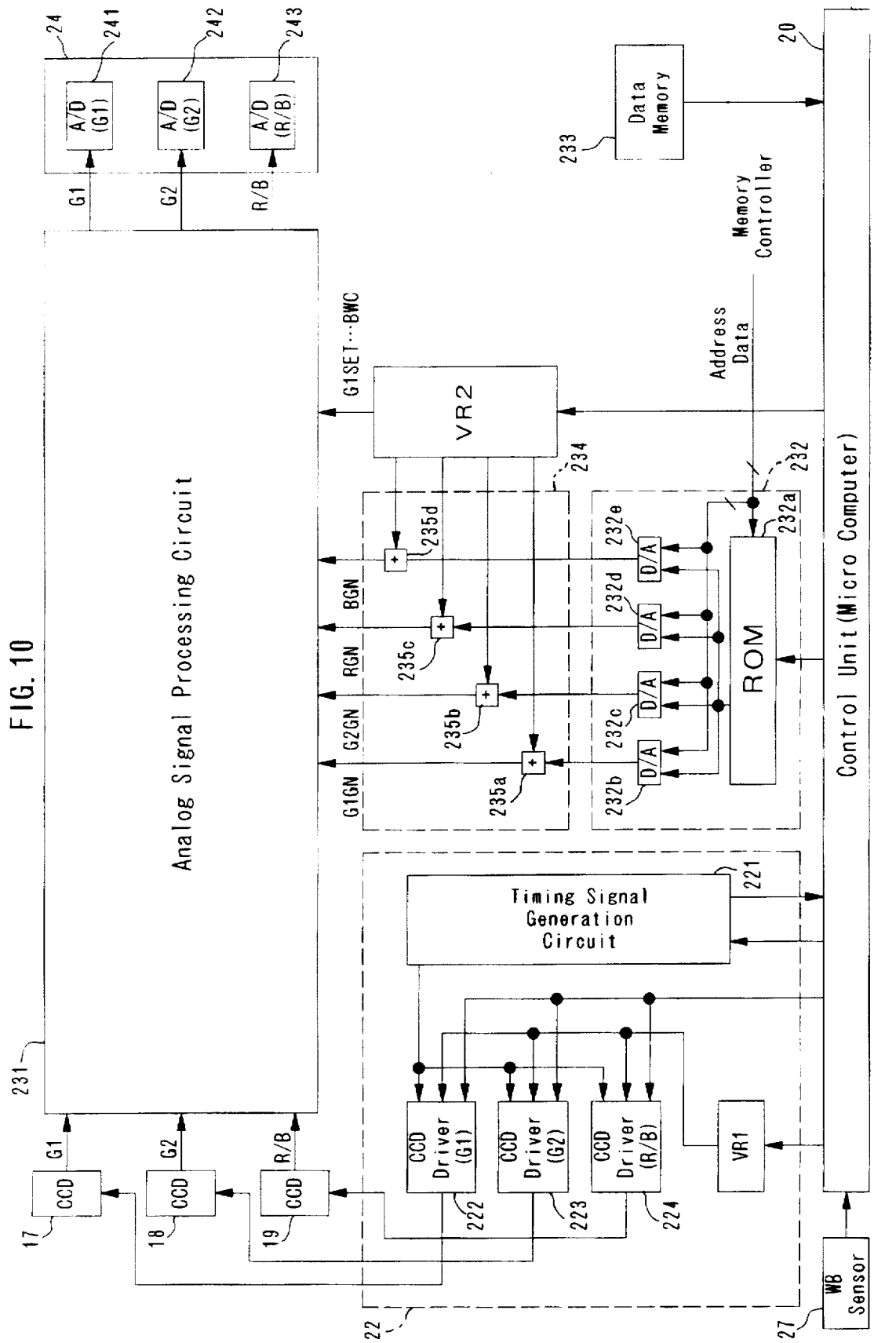
FIG. 10 is a block diagram of a CCD drive circuit and an analog processing unit of said embodiment.
Figure 11:
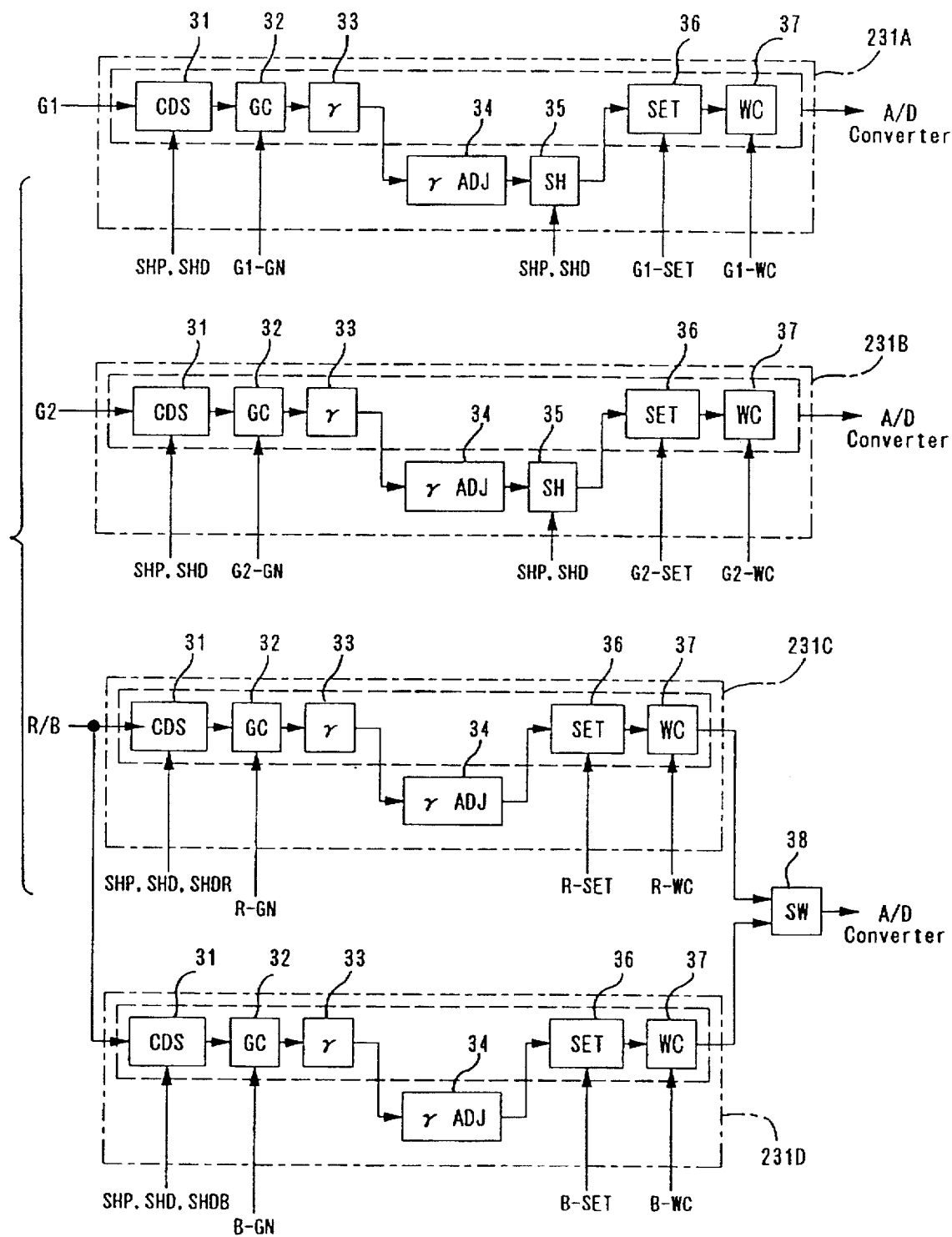
FIG. 11 is a block diagram of an analog signal processing circuit of said embodiment.

FIG. 10 is a block diagram of CCD drive circuit 22 and analog processing unit 23. FIG. 11 is a block diagram of an analog signal processing circuit.

In FIG. 10, members identical to the members shown in FIG. 9 are given the same numbers.

CCD drive circuit 22 comprises timing signal generation circuit 221, CCD drivers 222 through 224 and electronic volume VR1. Timing signal generation circuit 221 mainly generates timing signals needed for the drive of CCD drivers 222 through 224, analog signal processing circuit 231 and control unit 20.

CCD drivers 222 through 224 control the drive of G1 photo image CCD 17, G2 photo image CCD 18 and R/B photo image CCD 19, respectively. Electronic volume VR1 provides the bias voltage unique to each CCD.

Timing signal generation circuit 221 outputs to CCD drivers 222 through 224 timing signals to generate synchronized horizontal drive signals and vertical drive signals, timing signals to generate reset gate signals to reset the CCD gates, and transfer timing signals to transfer the accumulated electric loads to a transfer buffer, for example. CCD drivers 222 through 224 output horizontal drive signals, vertical drive signals, reset gate signals and transfer control signals at prescribed times based on the above-identified timing signals in order to control the image-sensing operation of corresponding CCDs 17, 18 and 19.

Timing signal generation circuit 221 also outputs to analog signal processing circuit 231 various sampling signals, sample hold signals, and clock pulses corresponding to each of the processing circuits in the circuit.

Shading compensation circuit 232 generates shading compensation signals used in the processing of G1, G2, R and B image signals, and comprises a ROM (read only memory) 232a comprising, for example, a flash memory, and four D/A converters 232b through 232e.

Shading compensation is performed to compensate for the variation in sensitivity among pixel data GD (i, j). Data SD (i, j) (digital data) for this compensation, which corresponds to pixel position (i, j), is stored in the ROM. Compensation data SD (i, j) corrects the level for pixel data GD (i, j) so that when the photo-taking screen is divided into many small areas (3,000 small areas, for example) and image sensing is performed as to a uniform screen, the average signal level for the peripheral areas would become equal to the average signal level for the center areas.

Four D/A converters 232b through 232e convert compensation data SD (i, j) which is read from ROM 232a and corresponds to G1, G2, R or B image signals, to analog signals. Compensation data SD (i, j) is sequentially read from ROM 232a based on the address data input from memory controller 26 into D/A converters 232b through 232e and converted into analog signals.

Electronic volume VR2 sets various kinds of adjustment data (DC voltage) necessary for the processing of signals in analog signal processing circuit 231. It sets, for example, white balance compensation voltage, set-up voltage and white clip (WC) voltage. The adjustment data is set in advance as digital data for G1, G2, R and B image signals, respectively, and is stored in data memory 233 comprising an EEPROM.

The adjustment data is read by control unit 20 and is transferred to electronic volume VR2 from data memory 233 when signals are processed. It is converted into analog signals and output by electronic volume VR2. White balance compensation voltage is output to interface circuit 234 while set-up voltage and WC voltage are output to analog signal processing circuit 231.

Interface circuit 234 adds together shading compensation data (DC voltage) output from shading compensation circuit 232, and white balance compensation voltage output from electronic volume VR2. It then performs level conversion to the sum and outputs the result to analog signal processing circuit 231. Interface circuit 234 comprises four adding/level conversion units 235a through 235d corresponding to G1, G2, R and B image signals, respectively. Gain adjustment values G1GN, G2GN, RGN and BGN of a gain controller, which is described below, are output from these adding/level conversion unit 235a through 235d.

In FIG. 11, analog signal processing circuit 231 comprises four signal processing circuits 231A, 231B, 231C and 231D that correspond to Gi, G2, R and B image signals, respectively. Signal processing circuit 231A for G1 image signals and signal processing circuit 231B for G2 image signals have the same circuit construction, and each comprise CDS (correlation double sampling) circuit 31 (indicated as CDS in the drawing), gain controller 32 (indicated as GC in the drawing), gradation compensation circuit 33 (indicated as γ in the drawing), gradation compensation adjustment circuit 34 (indicated as γ ADJ in the drawing), sample hold circuit 35 (indicated as SH in the drawing), set-up (black level adjustment) circuit 36 (indicated as SET in the drawing) and white clip circuit 37 (indicated as WC in the drawing).

Signal processing circuit 231C for R image signals and image processing circuit 231D for B image signals have the same circuit construction. Image processing circuits 231C and 231D have the same circuit construction as signal processing circuits 231A and 231B except that they do not have sample hold circuit 35.

Switch circuit 38 is a switching circuit for the re-synthesis of R image data that was processed by signal processing circuit 231C and B image data that was processed by signal processing circuit 231D. By re-synthesizing R image data and B image data prior to A/D conversion, the number of A/D conversion circuits may be reduced by one.

CDS circuit 31 is a double sampling circuit to reduce the noise of image signals output from the CCD. CDS circuit 31 performs CDS processing of image signals based on sampling pulses and sample hold signals input from timing generation circuit 221.

In signal processing circuits 231C and 231D, R/B image signals are separated into red image signals and blue image signals by means of the sampling processing performed by CDS circuits 31.

Figure 12A:
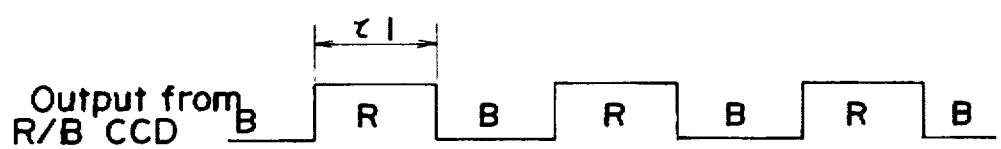
FIGS. 12(a), 12(b) and 12(c) are illustrations to explain the color separation process for R/B image signals.

FIG. 12 is an illustration to explain the color separation performed to R/B image signals. (a) shows the relationship between red color pixel data GD (i, 2k−1) and blue color pixel data GD (i, 2k) output from CCD 19. (b) is a waveform diagram pertaining to the sample hold signals to extract red color pixel data GD (i, 2k−1). (c) is a waveform diagram pertaining to the sample hold signals to extract blue color pixel data GD (i, 2k).

Since CCD 19 has red and blue vertical stripe filters, the CCD output comprises sequential signals comprising alternately aligned red color pixel data GD (i, 2k−1) and blue color pixel data GD (i, 2k). Time t1 is a period of time during which pixel data GD (i, j) is read.

When signals are processed, timing generation circuit 221 generates sample hold signals for CDS processing. At the same time, it also generates two types of sample hold signals SHDR and SHDB (signals with a τ2=2·τ1 sampling cycle) for color separation shown in FIGS. 12(b) and 12(c) by removing every other pulse of the sample hold signals described above.

Figure 12B:
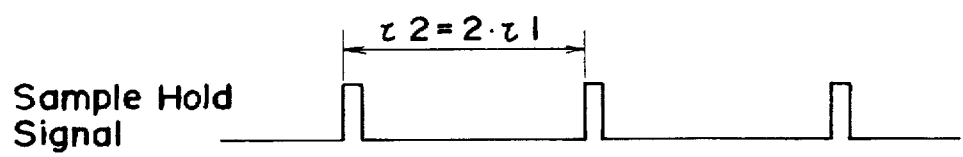
Figure 12C:
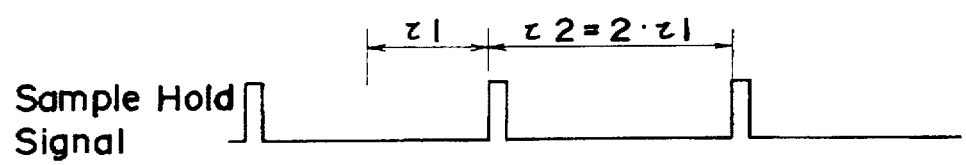

Sample hold signals SHDR are output to CDS circuit 31 of signal processing circuit 231C synchronously with the pixel data GS (i, j) read cycle, as shown in FIG. 12(b). Sample hold signals SHDB are output to CDS circuit 31 of signal processing circuit 231D synchronously with the pixel data GS (i, j) read cycle as shown in FIG. 12(c).

CDS circuit 31 of signal processing circuit 231C extracts red color pixel data GD (i, 2k-1) via the sample-holding of pixel data GD (i, j) based on sample hold signals SHDR, and CDS circuit 31 of signal processing circuit 231D extracts blue color pixel data GD (i, 2k) via the sample-holding of pixel data GD (i, j) based on sample hold signals SHDB.

Gain controller 32 adjusts the level of the image signal to a prescribed level. The level adjustment for G1, G2, R and B image signals is performed based on gain adjustment values G1GN, G2GN, RGN and BGN input from interface circuit 234, respectively, at which time shading compensation and white balance compensation simultaneously take place as well. In this white balance compensation, the signal levels for the G1, G2, R and B signals during achromatic image sensing are made equal.

Gradation compensation circuit 33 and gradation compensation adjustment circuit 34 convert γ characteristics. Gradation compensation circuit 33 performs γ conversion using a preset fixed γ value while gradation compensation adjustment circuit 34 performs adjustment of γ conversion. In gradation compensation adjustment circuit 34, the γ conversion value may be varied using a semi-fixed resistor, etc., and adjustment is carried out by adjusting this γ conversion value such that the γ characteristics of the G1, G2, R and B image signals become equal.

Sample and hold circuit 35 adjusts the phase of G1 and G2 image signals in A/D converter 24 to R and B image signals, respectively (so that the pixel positions for pixel data GD (i, j) of the respective colors coincide with each other), and corrects for the delay that occurs in the processing of signals in CDS circuit 31 through white clip circuit 37.

In other words, the processing of pixel data GD (i, j) must be done in a short period of time within read cycle τ1, and since there is a possibility that the A/D conversion phases will not coincide among pixel data GD (i, j) of the respective colors because of the variation in the processing time from CDS circuit 31 through white clip circuit 37, the processing timing is adjusted in sample hold circuit 35. As for R and B image signals, because signal processing cycle τ2 for pixel data GD (i, 2k-1) and GD (i, 2k) is twice as long as read cycle τ1, and there is therefore some extra time in the processing period, there is no sample hold circuit 35 in signal processing circuits 231C or 231D.

Set-up circuit 36 adjusts the black level (optical black) of the image data after A/D conversion to a prescribed level. The respective set-up circuits 36 of signal processing circuits 231A through 231D adjust the black level of the image data based on adjustment voltages G1-SET, G2-SET, R-SET and B-SET input from electronic volume VR2.

White clip circuit 37 clips the signal levels for the high brightness areas of the image data of the respective colors so that false color components do not occur when image signals have reached saturation. The respective white clip circuits 37 of signal processing circuits 231A through 231D perform WC processing of image data based on adjustment voltages G1-WC, G2-WC, R-WC and B-WC that input from electronic volume VR2.

Switch circuit 38 re-synthesizes R image data and B image data, which were separated, into the original R/B image data by switching the input terminal for the R image data and the input terminal for the B image data based on sample and hold signals input from timing generation circuit 221, and outputs the result of the re-synthesis to A/D conversion circuit 242.

Figure 13:
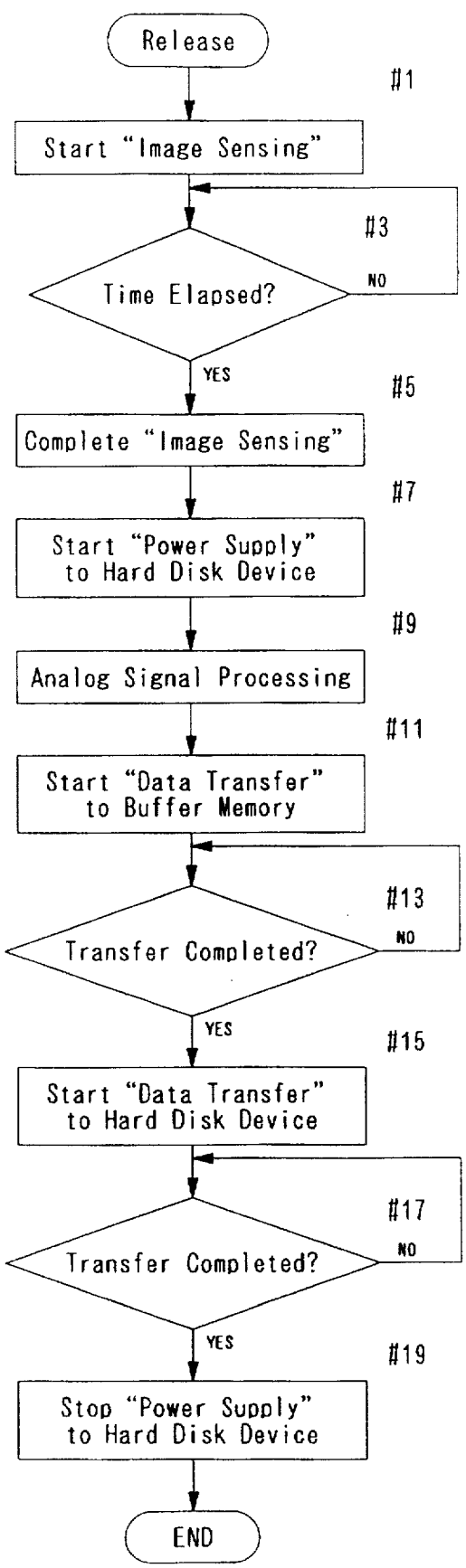
FIG. 13 is a flow chart showing the photo-taking sequence of the still video camera shown in FIG. 1.

The photo-taking operation of the still video camera will now be explained with reference to the 'release' flow chart of FIG. 13.

When release switch 8 is pressed and a signal instructing photo-taking is input, the shutter blinds 40 are opened, and exposure of CCDs 17 through 19 takes place for a prescribed period of time set in advance (#1 through #5). When the exposure of CCDs 17 through 19 is completed (completion of image-sensing), the power supply to mounted hard disk device 18 is activated (#7) and analog signal processing, such as CDS processing, gain control, γ conversion, set-up processing and white clip processing described above regarding analog signal processing unit 23, of the G1 image signals, G2 image signals and R/B image signals obtained takes place (#9).

Analog processing units 23 output image signals for the respective color components to the A/D converters 24. The A/D conversion results are temporarily saved in buffer memory 25 (#11, #13).

When the image data of the respective color components into buffer memory 25 has been saved (YES in #13), the transfer of the image data to hard disk device 13 begins (#15). The transferred image data is sequentially saved in a magnetic disk in hard disk device 13 (#17).

When recording of image data for each color component for one frame to the magnetic disk has been completed (YES in #17), the power supply to hard disk device 13 is stopped (#19), thus ending the photo-taking operation.

Figure 14:
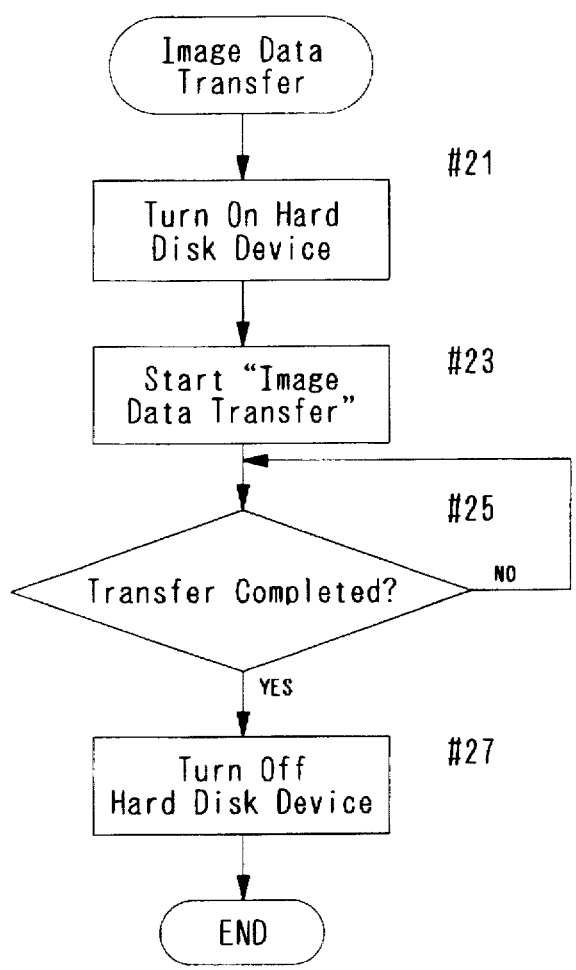
FIG. 14 is a flow chart of the sequence of transferring data recorded in a hard disk device in the still video camera shown in FIG. 1.
Figure 15:
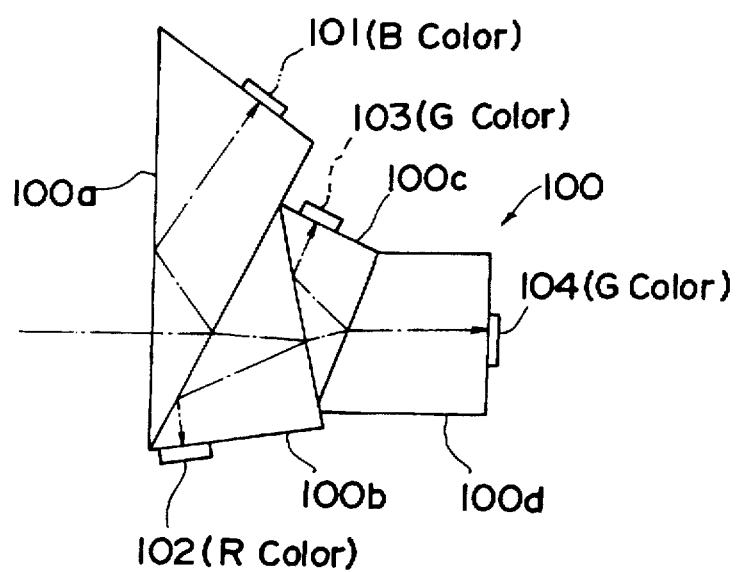
FIG. 15 is a side elevation of an image pickup unit comprising a four-color separating prism and four image pickup elements in a conventional image pickup device.
Figure 16:
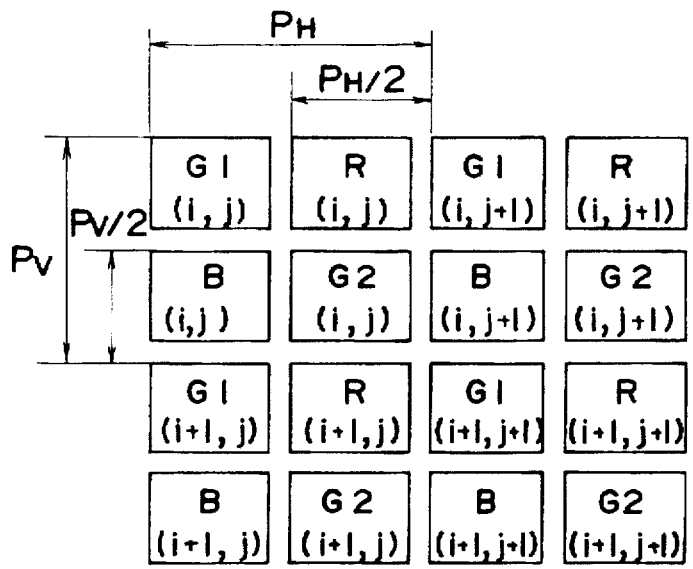
FIG. 16 shows one example of relative positions among the four image pickup elements in terms of the offset positioning of pixels on the image pickup surface.
Figure 17:
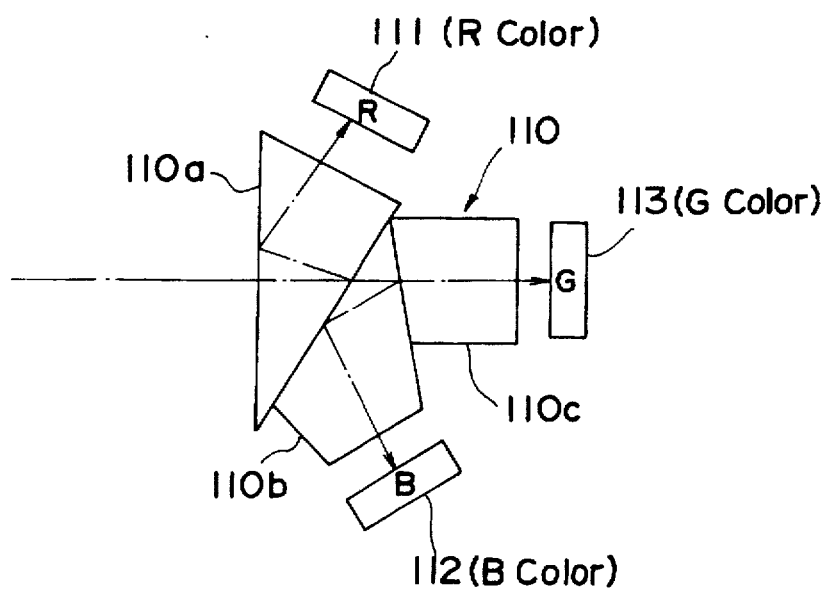
FIG. 17 is a side elevation of an image pickup unit comprising a three-color separating prism and three image pickup elements in another conventional image pickup device.
Figure 18:
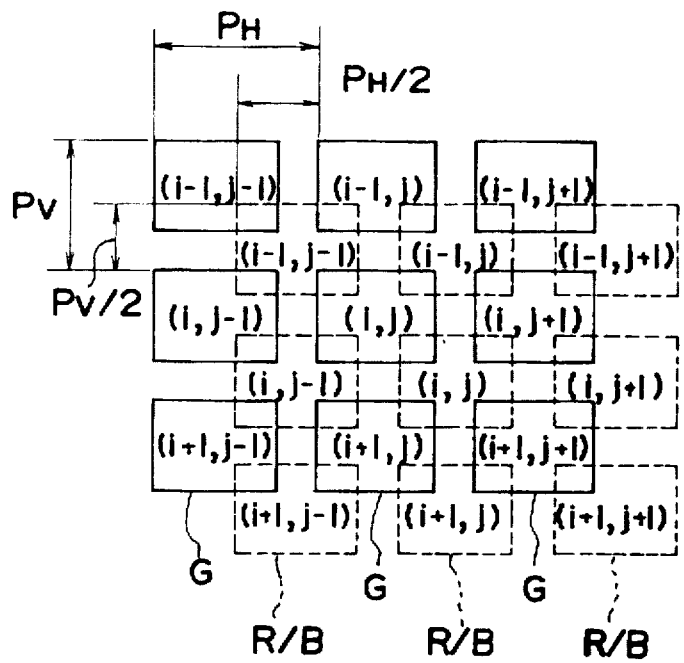
FIG. 18 shows one example of the relative positions of the three image pickup elements shown in FIG. 17 in terms of the offset positioning of pixels on the image pickup surface.
Figure 19:
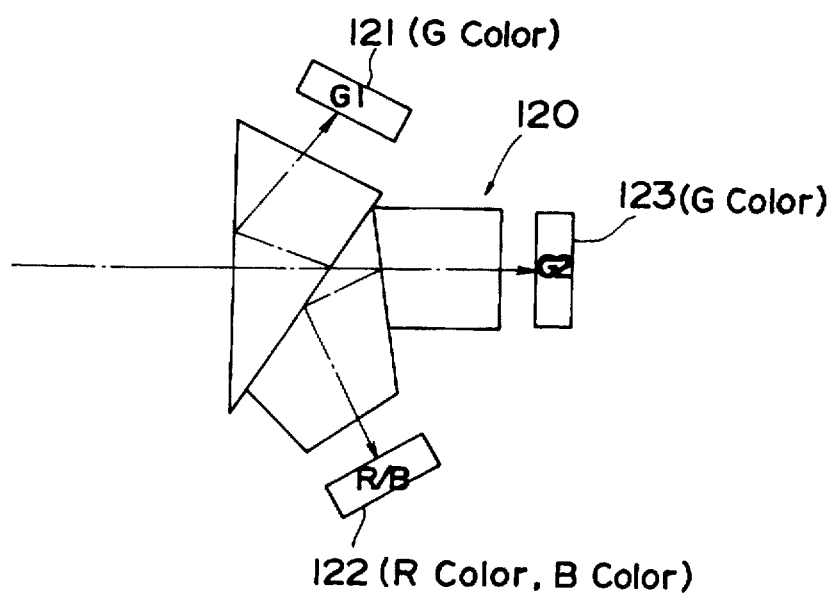
FIG. 19 is a side elevation of an image pickup unit comprising a three-color separating prism and three image pickup elements in the conventional dual green method.
Figure 20:
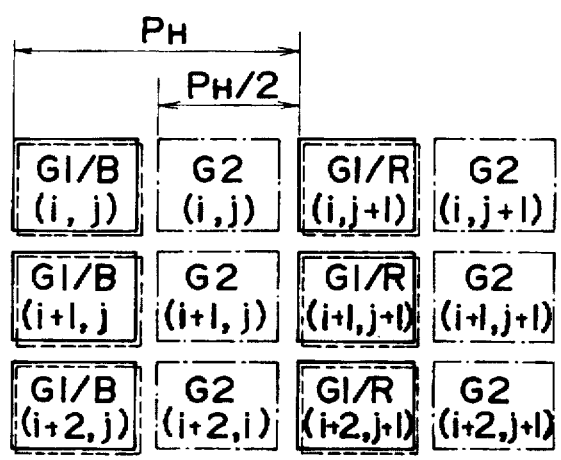
FIG. 20 shows one example of relative positions among the three image pickup elements used in the dual green method shown in FIG. 19 in terms of the offset positioning of pixels on the image pickup surface.

FIG. 14 is a flow chart showing the transfer sequence for data recorded on the hard disk device to a computer externally connected to the still video camera.

The sequence to transfer data recorded on the hard disk device begins according to the flow chart 'image transfer' in FIG. 14, when a data transfer command is sent from an external computer PC is received.

First, power is supplied to hard disk device 13 from power supply unit 28 to boot hard disk device 13 (#21). Then, data of a prescribed size is read from the magnetic disk and this data is sequentially transferred to computer PC via SCSI control unit 29 (#23, #25). When the transfer of data is completed (YES in #25), and after the power supply to hard disk device 13 is stopped (#27), the data transfer sequence comes to an end.

In the above embodiment, an explanation was provided using a hard disk device as an example. However, the present invention may also be applied when any other external recording media are used, such as floppy disk device, optical disk device, opti-magnetic disk device and memory card.

Moreover, in the above embodiment an explanation was provided using a still video camera as an example. However, the present invention may also be applied to a video camera that shoots moving images.

The present invention is applied in the above embodiment to an adapter that replaces the rear cover of a single lens reflex camera which ordinarily uses film. Needless to say, it may also be applied to a devoted photographic apparatus.

Further, while the present invention is applied in the above embodiment to a camera, it may also applied to any devices other than cameras that obtain images through image sensing and include measurement devices to optically measure the shape, size and condition of the measurement object and scanners to read the images on the film.

Using the above construction, the virtual pixel density obtained is four times the pixel density of an image pickup device comprising only a single image pickup element. As a result, high resolution image signals may be obtained in both the vertical and horizontal directions using a simple construction. Additionally, since the virtual pixel density for green color components is increased, spurious resolution due to color imbalance does not occur. Moreover, since it is only regarding green color components that resolution performance of the optical system is important, there are fewer limitations regarding lenses.

Using the above construction, a real image of the photo object is formed using the first optical system and this real image is reduced in size and formed on the image pickup surface of each of the color image pickup means using the second optical system, which comprises a reduction relay optical system. Consequently, by using the camera's optical system as the first optical system, a highly cost effective image pickup device may be constructed without suffering reduced resolution performance of the color image pickup means.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image pickup camera, comprising:

a first image sensor which is provided with a plurality of pixels arranged in a two-dimensional manner, said pixels receive a red and blue component of light;

a second image sensor which is provided with a plurality of pixels arranged in a two-dimensional manner, said pixels receive a green component of light;

a third image sensor which is provided with a plurality of pixels arranged in a two-dimensional manner, said pixels receive a green component of light;

a shutter control which controls a shutter to expose said first, second and third image sensors to light for a predetermined period of time; and wherein the pixels of said second image sensor and the pixels of said third image sensor are so arranged that corresponding pixels of the second and third image sensors receive the light of the image area which is offset by a distance $\sqrt{\{(PH/2)^2+(PV/2)^2\}}$, where PH is a lateral pixel pitch and PV is a vertical pixel pitch.

2. The image pickup camera as recited in claim 1, further comprising a color separating prism which separates an incident green component from an incident composite red and blue component.

3. The image pickup camera as recited in claim 2, wherein said prism separates the green component into two components.

4. The image pickup camera as recited in claim 2, wherein said prism includes two dichroic layers which reflect the respective composite red and blue component and green component.

5. An image pickup camera, comprising:

a first image sensor which is provided with a plurality of pixels arranged in a two-dimensional manner, said pixels receive a red and blue component of light;

a second image sensor which is provided with a plurality of pixels arranged in a two-dimensional manner, said pixels receive a green component of light;

a third image sensor which is provided with a plurality of pixels arranged in a two-dimensional manner, said pixels receive a green component of light;

an optical system which projects an optical image on image pickup surfaces of said first, second and third image sensors, said optical system having an interchangeable lens which is interchangeably mounted on a camera body; and wherein the pixels of said second image sensor and the pixels of said third image sensor are so arranged that corresponding pixels of the second and third image sensors receive the light of the image area which is offset by a distance $\sqrt{\{(PH/2)^2+(PV/2)^2\}}$, where PH is a lateral pixel pitch and PV is a vertical pixel pitch.

6. The image pickup camera as recited in claim 5, wherein said optical system includes a photo-taking lens which forms a real image of a photo object on an image plane, a relay lens which causes the real image formed on the image plane to be reformed on the image pickup surfaces of the image sensors, and a light separation prism which separates light of the image formed by said relay lens so as to form three images, an image of said three images being formed respectively on said first, second and third image sensors, said photo-taking lens being located in said interchangeable lens, and said relay lens and light separation prism being located in the camera body.

7. The image pickup camera as recited in claim 6, wherein said light separation prism is a color separating prism and said three images are the red and blue component and two green components.

8. The image pickup camera as recited in claim 7, wherein said prism includes dichroic layers which respectively reflect the red and blue component and the two green components.

9. An image pickup camera, comprising:

a first image sensor which is provided with a plurality of pixels arranged in a two-dimensional manner, said pixels receive a red and blue component of light;

a second image sensor which is provided with a plurality of pixels arranged in a two-dimensional manner, said pixels receive a green component of light;

a third image sensor which is provided with a plurality of pixels arranged in a two-dimensional manner, said pixels receive a green component of light;

an optical system which projects an optical image on image pickup surfaces of said first, second and third image sensors, said optical system having an interchangeable lens which is interchangeably mounted on a camera body; and a shutter control which controls a shutter to expose said first, second and third image sensors to light for a predetermined period of time;

wherein the pixels of said second image sensor and the pixels of said third image sensor are so arranged that corresponding pixels of the second and third image sensors receive the light of image area which is offset by a distance $\sqrt{\{(PH/2)^2+(PV/2)^2\}}$, where PH is a lateral pixel pitch and PV is a vertical pixel pitch.

10. The image pickup camera as recited in claim 9, wherein said optical system includes a photo-taking lens which forms a real image of a photo object on an image plane, a relay lens which causes the real image formed on the image plane to be reformed on the image pickup surfaces of the image sensors, and a light separation prism which separates light of the image formed by said relay lens so as to form three images, a first image formed on said first image sensor, a second image formed on said second image sensor and a third image formed on said third image sensor, said photo-taking lens being located in said interchangeable lens, and said relay lens and light separation prism being located in the camera body.

* * * * *

UNITED STATES PATENT AND TRADEMARK OFFICE
CERTIFICATE OF CORRECTION

PATENT NO. : 5,760,832
DATED : June 2, 1998
INVENTOR(S) : Mutsuhiro YAMANAKA et al It is certified that error appears in the above-identified patent and that said Letters Patent is hereby corrected as shown below:

The title page, showing an illustrative figure, should be deleted and substitute therefor the attached title page.

Delete Drawing Sheets, consisting of Figures 4 and 9, and substitute therefor the Drawing Sheets, consisting of Figures 4 and 9, as shown on the attached pages.

United States Patent [19]
Yamanaka et al.

[11] Patent Number: 5,760,832
[45] Date of Patent: Jun. 2, 1998

[54] MULTIPLE IMAGER WITH SHUTTER CONTROL

[75] Inventors: Mutsuhiro Yamanaka, Yao; Kazuchika Sato, Kobe, both of Japan

[73] Assignee: Minolta Co., Ltd., Osaka, Japan

[21] Appl. No.: 570,235

[22] Filed: Dec. 11, 1995

[30] Foreign Application Priority Data

Dec. 16, 1994 [JP] Japan .................................. 6-313334

[51] Int. Cl.$^6$ .................................................. H04N 9/09
[52] U.S. Cl. ........................ 348/264; 348/265; 348/338
[58] Field of Search .................................. 348/262, 264, 348/265, 336, 337, 338, 339, 222, 367, 368; 358/50, 43; H04N 9/09, 9/097

[56] References Cited

U.S. PATENT DOCUMENTS

| | | | |
|---|---|---|---|
| 4,334,238 | 6/1982 | Morishita et al. | 358/43 |
| 5,374,955 | 12/1994 | Furuhata | 348/264 |
| 5,414,465 | 5/1995 | Kodama et al. | 348/236 |

FOREIGN PATENT DOCUMENTS

| | | |
|---|---|---|
| 60-154781 | 8/1985 | Japan . |
| 6-217330 | 8/1994 | Japan . |
| 6339146 | 12/1994 | Japan . |

OTHER PUBLICATIONS

NHK Giken R & D Magazine (The Dual Green Pickup Experiment for A Compact HDTV Color Camera with three-⅔" CCDS), 1992, with English translation.

*Primary Examiner*—Sherrie Hsia
*Attorney, Agent, or Firm*—Sidley & Austin

[57] ABSTRACT

An image forming optical system comprises interchangeable lens 14 of a single lens reflex camera and reduction relay optical system 15. A three-color separating prism 16 that separates the photo image into two green photo images (G1 and G2) and a red/blue photo image (R/B) is located behind the image forming optical system, and CCDs 19 through 17 that perform image sensing as to RB, G2 and G1 photo images are located behind the transparent surfaces of prisms 16a through 16c, respectively. G1 CCD 17 and RB CCD 19 perform image sensing for the same photo image area while G2 CCD 18 performs image sensing for a photo image area which is offset by distance $\sqrt{\{(PH/2)^2+(PV/2)^2\}}$ (PH: lateral pixel pitch, PV: vertical pixel pitch) in the lower right direction relative to G1 CCD 17.

10 Claims, 15 Drawing Sheets

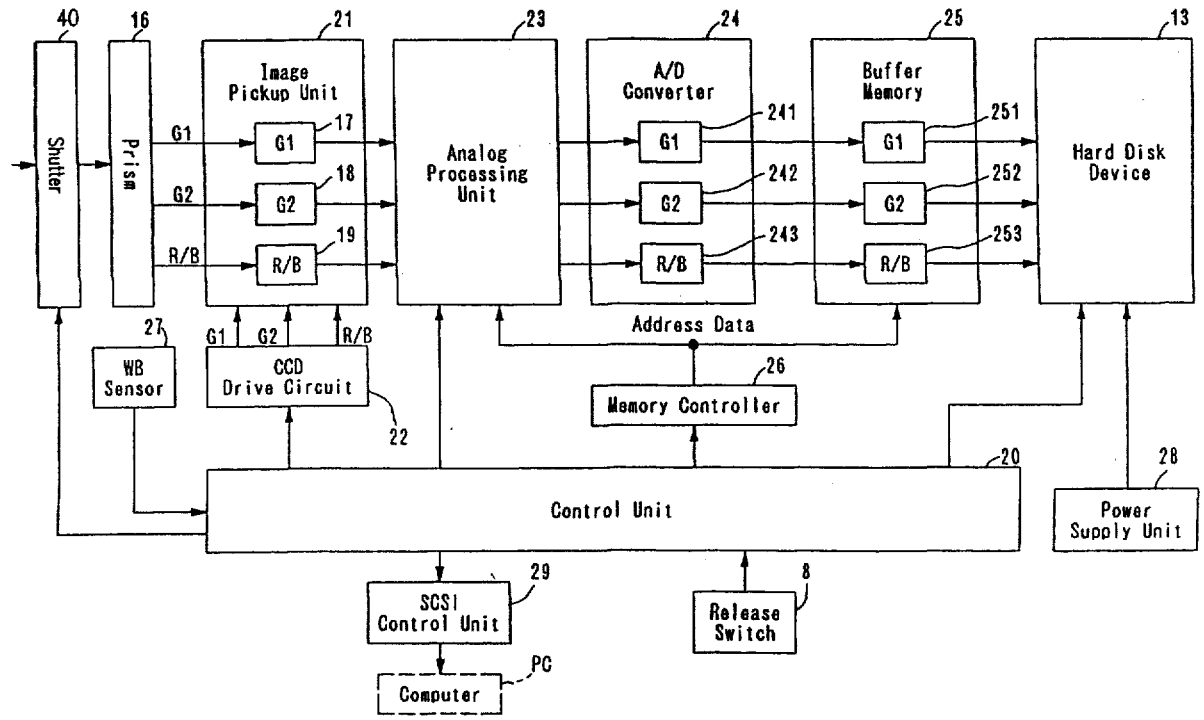

UNITED STATES PATENT AND TRADEMARK OFFICE
CERTIFICATE OF CORRECTION

PATENT NO. : 5,760,832
DATED : June 2, 1998
INVENTOR(S) : Mutsuhiro YAMANAKA et al Page 3 of 5

It is certified that error appears in the above-identified patent and that said Letters Patent is hereby corrected as shown below:

FIG.4

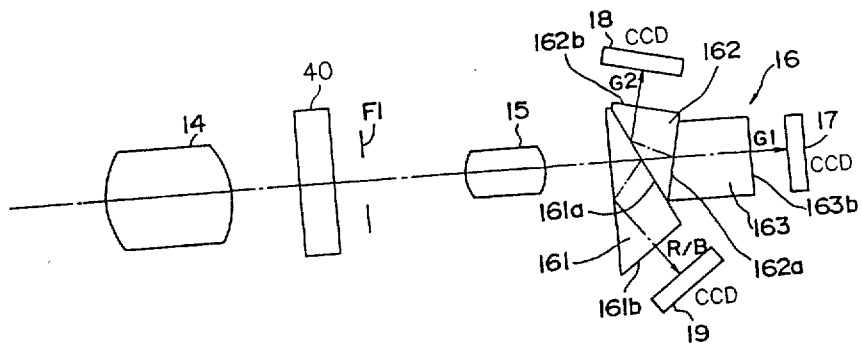

UNITED STATES PATENT AND TRADEMARK OFFICE
CERTIFICATE OF CORRECTION

PATENT NO. : 5,760,832

DATED : June 2, 1998

INVENTOR(S) : Mutsuhiro YAMANAKA et al

It is certified that error appears in the above-identified patent and that said Letters Patent is hereby corrected as shown below:

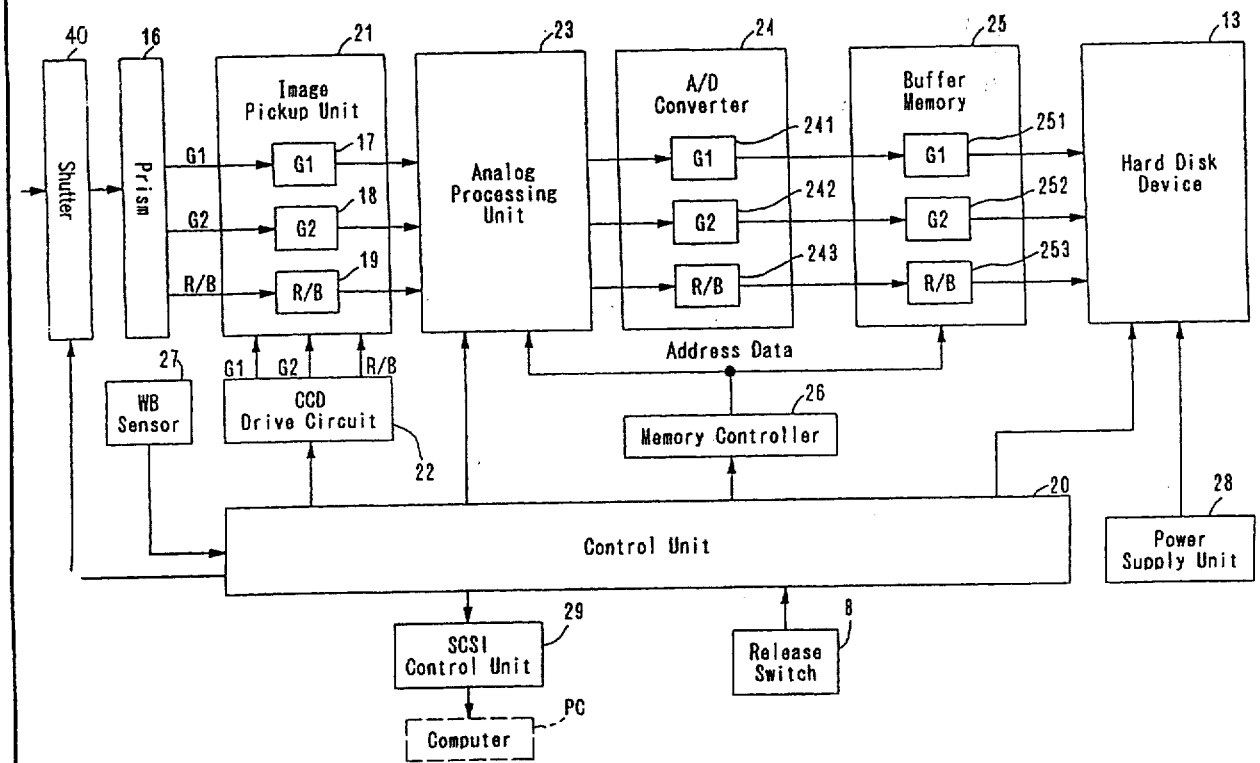

FIG. 9

UNITED STATES PATENT AND TRADEMARK OFFICE
CERTIFICATE OF CORRECTION

PATENT NO. : 5,760,832
DATED : June 2, 1998
INVENTOR(S) : Mutsuhiro YAMANAKA et al It is certified that error appears in the above-identified patent and that said Letters Patent is hereby corrected as shown below:

Column 13, claim 1, line 50, delete "light;" and
    insert --light; and--.

Column 13, claim 1, line 53, delete "time; and"
    insert --time;--.

Column 14, claim 5, line 15, delete "light;" and
    insert --light; and--.

Column 14, claim 5, line 20, delete "body; and" and
    insert --body;--.

Signed and Sealed this

Third Day of November, 1998

BRUCE LEHMAN

Attest:

*Attesting Officer*          *Commissioner of Patents and Trademarks*